United States Patent
Connor et al.

(10) Patent No.: US 6,295,611 B1
(45) Date of Patent: Sep. 25, 2001

(54) METHOD AND SYSTEM FOR SOFTWARE RECOVERY

(75) Inventors: William Hayden Connor; Bruce Kenneth Haddon, both of Boulder, CO (US)

(73) Assignee: Sun Microsystems, Inc.., Palo Alto, CA (US)

( * ) Notice: Subject to any disclaimer, the term of this patent is extended or adjusted under 35 U.S.C. 154(b) by 0 days.

(21) Appl. No.: 09/211,135

(22) Filed: Dec. 14, 1998

(51) Int. Cl.$^7$ ........................................................ G06F 11/00
(52) U.S. Cl. .................................................. 714/20; 714/15
(58) Field of Search .................... 714/15, 20, 38

(56) References Cited

U.S. PATENT DOCUMENTS

| | | |
|---|---|---|
| 4,814,971 | 3/1989 | Thatte . |
| 5,151,987 | 9/1992 | Abraham et al. . |
| 5,247,675 | 9/1993 | Farrell et al. . |
| 5,291,583 * | 3/1994 | Bapat ........................................ 717/5 |
| 5,341,491 | 8/1994 | Ramanujan . |
| 5,469,562 | 11/1995 | Saether . |
| 5,481,706 | 1/1996 | Peek . |
| 5,524,247 | 6/1996 | Mizuno . |
| 5,590,326 | 12/1996 | Manabe . |
| 5,590,335 | 12/1996 | Dubourreau et al. . |
| 5,594,861 | 1/1997 | Jönsson et al. . |
| 5,636,376 | 6/1997 | Chang . |
| 5,675,798 | 10/1997 | Chang . |
| 5,706,515 | 1/1998 | Connelly et al. . |
| 6,173,417 * | 1/2001 | Merrill ................................... 714/15 |

FOREIGN PATENT DOCUMENTS

| | | |
|---|---|---|
| 94/14126 | 6/1994 | (WO) . |
| 97/00476 | 1/1997 | (WO) . |

OTHER PUBLICATIONS

International Search Report, Application No. PCT/US 99/29039, mailed Apr. 17, 2000.

* cited by examiner

*Primary Examiner*—Dieu-Minh Le
*Assistant Examiner*—Bryce P. Bonzo
(74) *Attorney, Agent, or Firm*—Conley, Rose & Tayon, PC; Robert C. Kowert

(57) ABSTRACT

In an object oriented software environment, a system and method is disclosed that addresses both state recovery and relationship recovery in the event of a system halt. The system is suited to enterprise-class distributed systems with extensive object relationships. Each essential object is saved in persistent storage. Essential values within each object are updated in storage according to a method within each object. After a partial or total halt of the system, the state of the software is reconstructed in a two phase process. In the first phase, the essential objects are restored from persistent storage, along with essential values. In the second phase, a method uniquely implemented by each object will reconstruct non-essential objects and variables. The second phase is ideally tailored to allow the system to be reconstructed even when the underlying hardware or software has been altered.

11 Claims, 2 Drawing Sheets

METHOD AND SYSTEM FOR SOFTWARE RECOVERY

BACKGROUND OF THE INVENTION

1. Field of the Invention

The present invention relates to computer hardware and software, and more particularly to a method and system for recovering the state of object-oriented software in the face of partial or total failure of the underlying computing platform.

2. Description of the Prior Art

Failure of a computer can often result in the loss of significant amounts of data and intermediate calculations. The cause of failure can be either hardware or software related, but in either instance the consequences can be expensive, particularly when data manipulations are interrupted in mid-stream. In the case of large software applications, a failure might require an extensive effort to regenerate the status of the software and data prior to the failure. Several techniques have been developed to address this problem, and are disclosed in the following issued U.S. Patents:

U.S. Pat. No. 5,594,861 discloses an error handling system in a telecommunications exchange. Certain objects within software applications are defensively programmed to detect and report errors. An error handler object provides process centralized error handling functionality, and is configured to determine and specify a recovery for returning the software application to a well defined state.

U.S. Pat. No. 5,151,987 discloses a system and method for recovering objects in an object oriented computing environment. A recovery from an unplanned failure is executed by storing recovery information in recovery objects. The recovery information is limited to only that information which is necessary to recover from unplanned failures.

U.S. Pat. No. 5,469,562 discloses a system that provides recovery from the effects of incompletely executed transactions in the event of a fault. During execution, certain data is stored in persistent memory. During fault recovery, the system calls the agent specific procedures, as needed, using the recovery and recovery sequence information stored during normal transaction execution.

U.S. Pat. No. 4,814,971 discloses a virtual memory recovery system wherein periodic checkpoints are taken of the state of a computer system. If a system crash occurs, the machine state can be rolled back to the checkpoint state and normal operation restarted. Modifications made after the checkpoint time are discarded when the system state is rolled back to the saved checkpoint state. As used herein, the term "persistent" is in reference to a computer memory storage device that can withstand a power reset without loss of the contents in memory. Persistent memory devices, have been used to store data for starting or restarting software applications. In simple systems, persistent memory devices are static and not modified as the software executes. The initial state of the software environment is stored in persistent memory. In the event of a power failure to the computer or some other failure, the software restarts its execution from the initial state. One problem with this approach is that all intermediate calculations will have to be recomputed. This can be particularly onerous if large amounts of user data must be reloaded during this process. If any of the user data is no longer available, it may not be possible to reconstruct the pre-failure state.

More sophisticated executable programs might dynamically update the configuration of persistent memory. The updates can take the form of a "snapshot," or duplicate, of the entire contents of the relevant portion of computer memory. The updates can also be limited to certain key intermediate results. This allows for more efficient software recovery because intermediate calculations can be stored and then recovered from persistent memory. During the recovery process, the software restarts from its last saved state. For example, whenever a large batch of data is processed, a snapshot of the current state of the software can be stored to persistent memory. In the event of a failure, the large batch of data will not have to be reloaded and reprocessed.

Another class of solutions is to have redundant hardware configurations. In the event of a hardware failure, the redundant processors can take over the functions of the failed hardware. Ideally, this should happen with no human interaction, but in any event, within a time frame consistent with "high availability" objectives. Most of these schemes depend upon a predefined "configuration" record, together with copies of the state of the "lost" programs. Thus, the relationships are static, and often the recovered programs proceed using the last known state of the failed program. Often this happens without the recovered program having a record that a recovery has taken place.

Object-oriented programming environments present unique challenges for software recovery efforts. Software objects are typically encapsulated blocks of code that can be saved in persistent storage. In the event of a failure, this strategy can often recover the objects. Some examples of this approach can be found in the set of UNIX start scripts and user preferences used by end-user type applications. However, object oriented software environments typically have rich inter-object relationships. These relationships are established due to the logical dependencies between the objects. A simple recovery strategy can successfully recover the objects, but will not recover the inter-object relationships.

A desirable system for software recovery in object-oriented environments would recover the objects themselves, along with the inter-object relationships. The present invention addresses this need.

SUMMARY OF THE INVENTION

In an object oriented software environment, the present invention is a unified technique that addresses both state recovery and relationship recovery. It operates at the level of constituent components of the executing program, which are generally objects within an object-oriented software environment. The recovery system provides for cognizance to be taken by each component of any environmental changes that may have occurred between the failure and the recovery. Thus, the present invention is well suited to enterprise-class distributed systems with extensive object relationships, particularly when the software needs to be robust in the face of failures in various parts of the system.

The present invention restores objects, along with interobject relationships, by intelligently rebuilding the software state based on fundamental, or "essential", information stored in persistent storage. Each object does not have to be restored to its exact pre-failure state. It is possible to make intelligent recovery decisions based on the state of the system after it is recovered. Thus, it is possible to make the system robust to certain hardware or software failures, since the system can intelligently compensate for the failure of individual elements.

According to the present invention, objects, and values within an object, are deemed "essential" or "non-essential"

based on the logical structure of the software. Values that can be recreated by reference to other values are "non-essential" because they can be recreated in the event of software failure. Values that must be stored in order to recreate the state of the software are "essential." By extension, any object that contains an essential value is an "essential object."

Essential objects are stored in persistent storage. In addition, each essential object updates its essential values to persistent storage according to a schedule that takes into account the logic required for reconstructing the object. For purposes of this disclosure, the process of updating the essential values in persistent storage is called "pickling" the values.

After a failure, there is a two phase process for recovering the software. "Phase 1" recovery involves restoring, from persistent storage, an instance of each essential software object along with its essential values. "Phase 2" recovery involves executing a "hydrate" method within each essential object wherein it exists. The purpose of a hydrate method is to derive all non-essential values from essential values, and thereby reestablish inter-object relationships. The hydrate method is also configured to recreate non-essential objects. Each hydrate method contains logic for handling contingencies wherein certain hardware or software may be unavailable at the time of recovery. In general, each essential object will have a customized hydration method.

The process of pickling an object can often be generically defined for all objects. Typically, this is accomplished by making a method call to a "pickle" object having a "pickle" method. In general, each essential object has its own logic to determine the timing and frequency of the calls to the pickle object.

The present invention is also useful in situations wherein individual objects need to be removed or updated without taking down an entire object oriented computing environment. The removal of a particular object from a software system will often cause failure of the entire software environment. Instead, the present invention provides an architecture wherein an updated object can be restored in place of an older object, and the updated object will "hydrate" itself in an orderly progression without fatal consequences to the remainder of the software environment.

BRIEF DESCRIPTION OF THE DRAWINGS

A more complete understanding of the present invention can be obtained by considering the following detailed description of the preferred embodiments thereof in conjunction with the accompanying drawings, in which.

DETAILED DESCRIPTION OF THE INVENTION

The present invention is a system and method for recovering the state of an object oriented software environment. For purposes of this disclosure, the "state" of the programming environment refers to the structure, content, and inter-relationships of software objects and their variables. In the event of a failure in the underlying computing system, the present invention provides a framework for intelligent reconstruction of a functional state of the software, even when portions of the distributed computing environment have been changed.

Figure 1:
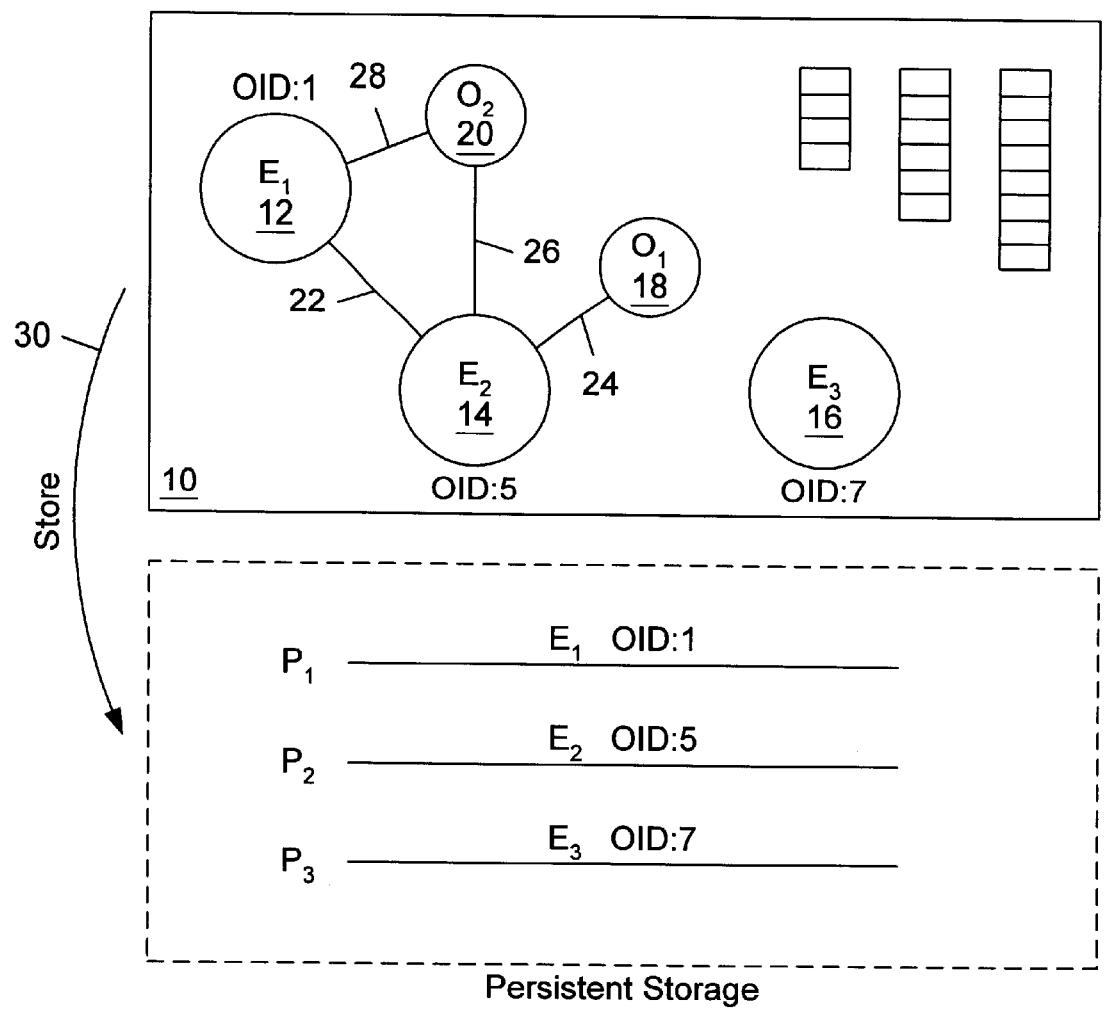
FIG. 1 is a schematic representation of the pickling process according to the present invention.

Referring to FIG. 1, the state of the software environment is shown schematically enclosed within block 10. Software objects are shown schematically as circles labeled 12, 14, 16, 18, and 20. The number of objects in FIG. 1, and their logical arrangement, has been chosen arbitrarily for purposes of illustration, and many variations are possible within the scope of the present invention. For purposes of illustration, objects 12, 14 and 16 are "essential" objects, and have been further designated by the labels E1, E2, and E3 to show their status as "essential." Objects 18 and 20 are non-essential, and have been further designated by the labels O1 and O2 to indicate their status. In the upper right corner of block 10, there are shown several thread tables, indicating several ongoing tasks within the software environment.

FIG. 1 also has lines between objects, which show schematically logical associations between objects. For example, line 22 shows a logical connection between essential object 12 and essential object 14. This indicates that, for example, a variable within object 14 is dependent upon the value of another variable within object 12. Other types of logical connections may include methods within object 12 that call upon other methods within object 14. There may be logical connection of many varieties as would be known to practitioners, and the logical connections may span across any number or type of objects, as shown by lines 24, 26, and 28. As a further example, essential object 16 in FIG. 1 does not have any logical relationships to other objects; therefore, it may be inferred that none of its variables depend upon other values outside of the object.

The essential objects 12, 14, and 16 each have an associated "object identifier"(also referred to an object id or an OID). The function of an object id is to identify an object without having to know its location in memory. In the preferred embodiment, the object id uniquely identifies the object, even after it has been regenerated during the course of recovery of the software environment.

Referring again to FIG. 1, below block 10 there is shown a series of lines identified as E1, E2, and E3. These lines represent persistent storage locations which contain stored versions of essential objects E1, E2, and E3. The OID of each essential object is also shown above its corresponding line to indicate that the object identifier has been stored along with the object. The designations P1, P2, and P3, located to the left of each corresponding line, are symbolic of stored "pickles" which contain essential values for each essential object, as further described herein.

The persistent storage can take a number of different forms, for example a "file system" or a "database." The serial stream for each "pickle" is stored according the format that is most convenient for the structure of the persistent storage. A number of standard databases are useful in this regard, for example, the persistent storage can be set up using databases from Oracle Corporation, Sybase, or any of the standard SQL driven databases.

Pickling

According to the present invention, a "persistent object" is defined which includes two elements: (1) an available "definition" that can be used to create a new instance of the object (typically a "class" definition, but not necessarily so), and (2) a "pickle" which is a persistent copy of the last known state of the internal variables of that object. The persistent objects are shown schematically in FIG. 1 below block 10. The process of storing persistent objects is shown schematically in FIG. 1 by the arrow labeled 30.

The overall execution system is operated so that the set of persistent objects stored represents a sufficient set of objects which, when recovered, will allow restoration of the state of the system as a whole to an equivalent, or closely proximate, state to that when the system, for instance, halted. Other objects may also be present in the system, however the essential objects are responsible for either recovering, replacing, or otherwise compensating for the loss of the non-essential objects (if needed at all). The essential objects will from time to time proactively activate a process called "pickling", which makes a persistent copy of the state of the internal variables of the object (thus generating a "pickle"), shown as P1, P2 and P3 in FIG. 1.

The recovery process guarantees that a persistent object will be offered the opportunity to recover to its last saved state, i.e., to its last pickle. The pickle may include static state (state of object fields, attributes, or properties) runtime state (parameters, stack variables, current execution point), or any combination of these. If desired, pickles may be kept in a persistent store that uses such facilities as sharing, mirroring, or other techniques, to complement the robustness of the recovery process.

The process of pickling an object is generic, which means that a single method within a "pickling object" can be used to pickle all other objects. In the preferred embodiment, the pickling method, when called, generates a persistent stored version that can be later used to recreate the object. Also in the preferred embodiment, each essential object within the software environment makes method calls to the same pickling method whenever an essential value has changed. It will be understood by practitioners that there may be cases wherein several different pickling method implementations are required, depending on the architecture of the software environment.

Since essential values within different objects will change at different times, both the timing and the frequency of calls to the pickling method will vary individually from object to object. Each object has calls to the pickling method based on the object's needs. Depending on the nature of the object, there are different logical steps necessary to recreate the object, the values of the parameters within the object, and the relationships with other objects. Thus, there may be different circumstances for each object under which the object needs to pickle itself.

An example of an implementation of the present invention is in a software application manager that can take over functions from a system administrator. These functions may involve checking servers, configuring servers and updating software. In this example, consider an object that updates software within several servers in a network. The object calls each server in a list, incrementally, and performs the required operations on that server. In the event of a power failure that interrupts the operation of the object, the software according to the present invention would have to recreate the object so that the object could continue updating the servers. In certain instances, there may be dire consequences from performing the same operation twice on the same server. Therefore, the object will have to store its current position on the list of servers. The current position on the list would be considered an "essential value" which would be stored and recovered from persistent memory. The recovered object could thereby continue updating servers without performing the same update twice on the same server. To accomplish this goal, the object would be programmed to call the pickle method at the start of each server update.

Essential objects get pickled, for example, by conversion of all essential values into a serial stream which is sent to persistent storage. During recovery, the available definition and the stored essential values are used to create an instance of the object, also called an "instantiation" of the object. The following code is illustrative of a method for pickling:

```
/** This method will persist an essential object and return the OID by
* which the object may be later retrieved. Essential objects are restored as
* part of the recovery process. During the second phase of recovery (after
* which all objects have been read back), the hydrate methods (if not null)
* of all Essential objects will be called. The hydrate method provides a
* place for recovery actions that depend on the presence of other Essential
* objects, such as rebuilding associations between Essential objects.
* @param object The Essential object to be persisted
* @param hydrate Method (no arg or return) to call after all objects
* have been recovered
* @return OID The assigned OID that uniquely refers to the pickled
object
* @exception PersistenceException setPersitor( ) was never called
*/
public static OID pickle (Serializable object, String hydrate)
    throws PeristenceException
{
    // Preconditions
    if (object == null)
        throw new IllegalArgumentException( );
    if (persistor == null)
        throw new PersistenceException (
        PersistenceException.UNAVAILABLE, null, null);
    // Get the OID from the ObjectTable
    OID oid = ObjectTable.put (object);
    persistor.store (oid, new Record (oid, hydrate, true, object));
    return oid;
}
```

The Recovery Process

The recovery process is divided into two logical segments, which are herein called "Phase 1" and "Phase 2." Phase 1 recovery generally involves instantiating each essential object. Phase 2 generally involves generating non-essential values within each object, instantiating non-essential objects, and reestablishing the inter-object relationships. According to the present invention, it is important to complete Phase 1 recovery before initiating Phase 2 recovery so that the essential objects are already in existence prior to calling any methods associated with Phase 2 recovery. A recovery manager, comprised of a software object, is used to coordinate the Phase 1 and Phase 2 recovery.

Phase 1 Recovery

Figure 2:
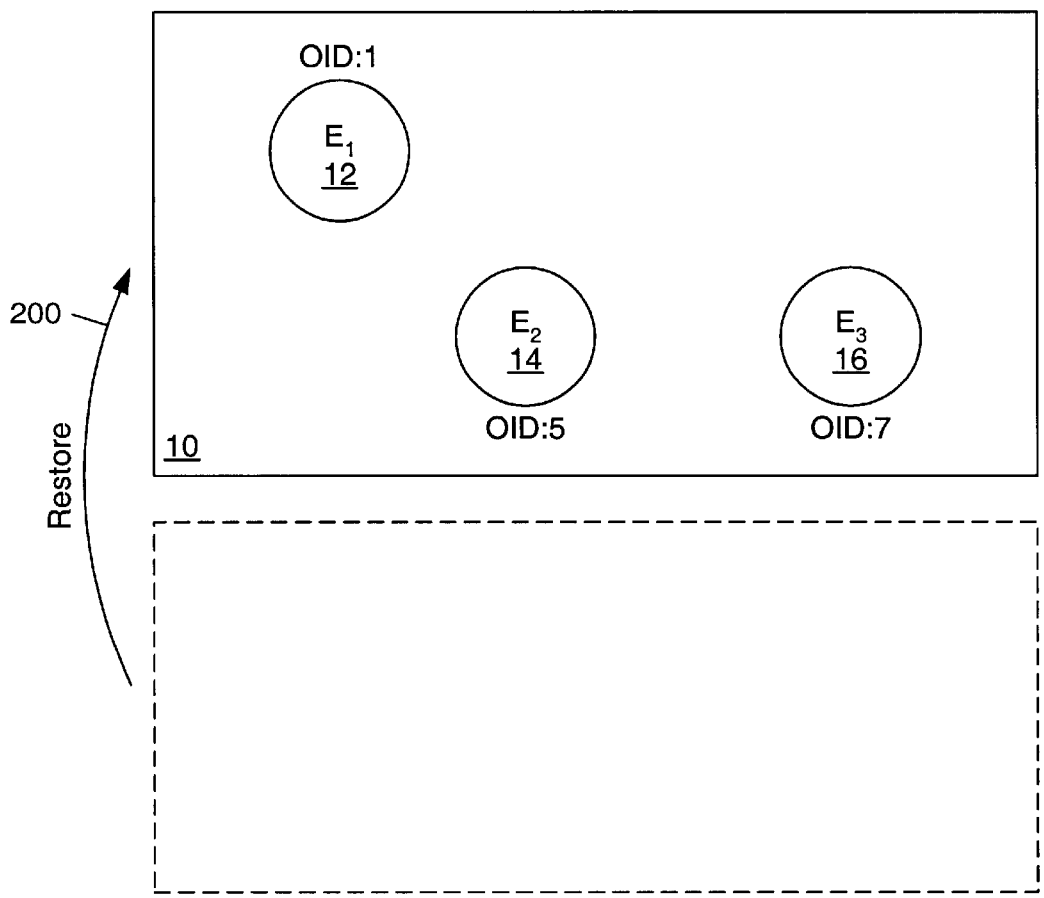
FIG. 2 is a schematic representation of Phase 1 recovery according to the present invention.

Phase 1 recovery is shown schematically in FIG. 2. During this phase, the data from persistent storage is used to create instances of each essential object. Referring again to FIG. 2, the arrow below block 10, labeled 200, shows schematically that information from persistent storage is systematically restored to computer memory. It will be understood by practitioners that the reconstituted essential objects will not necessarily occupy their former locations in the computer memory. However, in the preferred embodiment, each essential object will have the same OID as previously.

As shown schematically in FIG. 2, the persistent objects have been converted back to objects 12, 14, and 16 within the computer memory, represented by block 10. The non-essential objects that existed previously, shown as 18 and 20 in FIG. 1, have not yet been reconstructed at this stage. Also, the logical connections between the essential objects, as exemplified by line 22 in FIG. 1, have not been reconstructed at this stage.

In order that the associations with peer objects may be reestablished, the instantiations of all essential objects are done before invoking any specified "hydrate" method, as further described in Phase 2. By the time the hydrate method within each object is called, each essential object will be in existence, and associations between objects can be reestablished.

The following sample code is illustrative of Phase 1 recovery process:

```
// Phase I - recover object state
// Get info about each object, particularly whether it's a root object. Note
// that Record will not read in the object when recoveryPhase == 0 so that
// we don't read the objects twice. (see Record.readObject( )).
Object [] records = persitor.enumerate( );
// Now get the essential objects
recoveryPhase = 1; // Triggers Record to actually read the object.
               // See Record.readObject( )
for (int i = 0; i < records.length; i++)
{
    Record record = (Record) records [i];
    if (record != null && record.isRoot( ))
        try
        {
            // get the object
            record = persistor.restore (record.getOID( ));
            // stuff it into the Object Table
            ObjectTable.putOID (record.getObject( ),
            record.getOID( ));
            records[i] = record;
        }
        catch (ThreadDeath td) { throw td; }
        catch (Throwable t)
        {
            Out.logerror ( );
        }
}
```

Phase 2 Recovery

At the conclusion of Phase 1, each essential object is in existence, but may not be fully populated with its non-essential values. During Phase 2 recovery, each essential object is given the opportunity to recompute non-essential values. For purposes of the present example, each object's provided method is called a "hydrate" method, and the process of calling such a method is called "hydration."

The process of hydration also allows objects to reestablish their associations with other objects. The hydration is accomplished only after Phase 1 has completed its task of instantiating new copies of the essential objects. Then, if the object has so specified, the new instance is notified that it is taking over the function of a failed instance by invoking the hydrate method. The object, through the implementation of the hydrate method, has the opportunity to decide, based on the current environment and other available information, which parts of the old state apply to the current situation, and those parts that need to be updated, changed, or abandoned.

Figure 3:
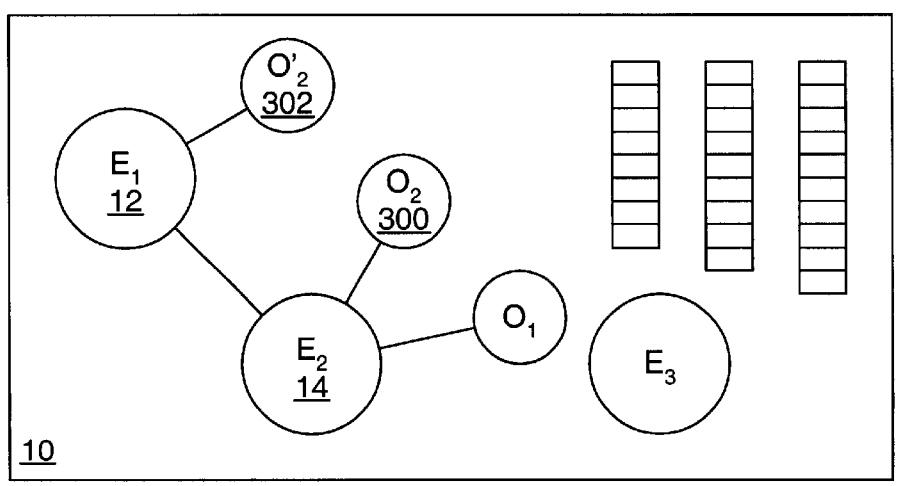
FIG. 3 is a schematic representation of Phase 2 recovery according to the present invention.

Referring to FIG. 3, the state of the software environment is shown within Block 10 after the completion of Phase 2 recovery. Each of the essential objects, E1, E2, and E3, has been regenerated from persistent storage. A hydrate method within each object has been executed to reestablish inter-object relationships, and to recreate non-essential objects. Thread tables are shown in the upper right corner of FIG. 3 to indicate that software tasks are executing.

One of the important aspects of the present invention is that the software environment does not necessarily have to be reconstructed as an exact duplicate of its previous state. Each hydrate method can be implemented to respond appropriately in the event that the hardware or software environment has been altered in some way.

As shown in FIG. 3, the non-essential objects do not necessarily have to be recreated in their identical pre-failure configuration. A comparison of FIG. 1 with FIG. 3 shows that the non-essential object labeled 20 in FIG. 1 has been reconstituted as two separate non-essential objects labeled 300 and 302 in FIG. 3. There may be a variety of reasons for the hydrate methods in objects 12 and 14 to configure the structure this way—for example, there may be missing or reconfigured hardware or communications links compared with the previous state.

The hydrate method within each essential object may, for example, maintain a "status" indicator, so that there will be a record of whether that object has been fully hydrated. Certain variables within an object may depend on a method call to other objects—therefore, the hydrate method must make that method call in order to properly hydrate itself. In the event that the called object is not itself fully hydrated, the called object can appropriately respond to method calls from other objects by, for example, requesting a delay. Thus, method calls from other objects may have to be repeated until an appropriate response is received.

In the general case, non-essential values may have to recreated from a combination of essential and non-essential values which are herein referred to as "prerequisite" values. During the recovery process, it is logically necessary to restore the prerequisite values before the corresponding non-essential value can be recovered. It may be necessary to delay the recovery of certain non-essential values until each of the prerequisite values can be restored from their respective prerequisite values.

For example, suppose a first object has a value A with prerequisite values B, C, and D. Suppose values B and C are essential values, and value D is a non-essential value. Thus, the first object is an essential object and has been periodically pickled along with the current values of the essential values B and C. Suppose further that value D has prerequisite values E and F which are essential values located within a second object. In this example, the recovery process could proceed as follows. The first object will be recovered from persistent storage, including the essential values B, and C. Next, the hydrate method within the first object is executed, wherein the value A must be computed based on the values B, C, and D. Values B and C are available, and value D must be computed based on input from the second object. According to the logic in the hydrate method, the first object requests the second object to return values E and F. In the event that the second object has not itself been fully hydrated, the hydrate method in the first object must be logically configured to wait and resend the request until the second object is fully hydrated and the values E and F can be returned. Thus, the first object cannot be fully hydrated until the second object is fully hydrated. It is important to consider the logic of the hydrate method within each object to avoid an impasse wherein the first object and the second object are each waiting for the other to fully hydrate. The following code is illustrative of Phase 2 recovery:

```
//Phase 2 - Hydrate. Call a specified (if specified) method on
the object after Phase 1
recoveryPhase = 2;
{
    for (int i = 0; i < records.length; i++)
    {
        Record record = (Record) records[i];
        if (record != null && record.getHydrateMethod( ) != null)
        {
            Object object = record.getObject( );
            if (object != null)
            {
                try
                {
```

-continued

```
            object.getClass( ).getMethod
            (record.getHydrateMethod( ));
            }
            catch (ThreadDeath td) { throw td; }
            catch (Throwable t)
            {
            Out.logError ( );
            }
          }
        }
      }
}
```

The present invention is suitable for situations wherein a software object must be updated or revised within a mission critical system. It is often costly or difficult to take a software system "off-line" so that a new update can be made to the software. In an object oriented environment, software update can occur in the form of new versions of particular objects. According to the present invention, an object can be replaced with a new version of itself as follows: first, delete the old object; next, insert the definition of the new object, wherein a hydrate command exists within the new object that is capable also of rehydration based on the pickle of the old object. This application of the invention allows enterprise-wide software systems to remain functional on a continuous basis while simultaneously allowing updates to the software.

The present invention can be extended to cover "satellite objects" which may not have a direct connection to persistent storage. An example of a satellite object is a modem pool management device, which controls the function of several modems, but does not have its own persistent storage. Such a device is typically connected by a network to a processor with access to persistent storage. The functions of pickling and hydrating the modem pool object can be accomplished through the network in an extension of the present invention.

It will be apparent to those of skill in the appertaining arts that various modifications can be made within the scope of the above invention. Accordingly, this invention is not to be considered limited to the specific examples or embodiments chosen for the purposes of disclosure, but rather to cover all changes and modifications which do not constitute departures from the permissible scope of the present invention. Having thus described our invention, what is desired to be secured and covered by Letter Patent is presented in the appended claims.

What is claimed is:

1. A method for saving and recovering the state of software in an object oriented software environment said method comprising the steps of:
    (a) recording persistent objects into persistent storage, said recording occurring at times designated by each of a plurality of essential objects;
    (b) instantiating a replacement object for each of the plurality of essential objects, based on the persistent object;
    (c) executing a hydrate method within each of the plurality of essential objects;
    (d) instantiating replacement non-essential objects; and
    (e) generating non-essential values.

2. The method according to claim 1, wherein the step of recording persistent objects further comprises the step of serializing the persistent objects prior to storage.

3. The method according to claim 1, wherein the step of generating non-essential values further comprises the step of making at least one method call on at least one of the plurality of essential objects.

4. The method according to claim 3, further comprising the step of repeating the at least one method call.

5. The method according to claim 1, further comprising the step of configuring the persistent storage into a file system.

6. The method according to claim 1, further comprising the step of configuring the persistent storage into a database structure.

7. The method according to claim 1, further comprising the step of verifying, within each of the plurality of essential objects, whether all of its values have been restored.

8. A system for saving and recovering the state of software in an object oriented software environment, said system comprising:
    (a) persistent objects stored within persistent storage, said persistent storage accessible by the software environment, wherein said persistent objects are stored at times designated by each of a plurality of essential objects;
    (b) a recovery manager for instantiating a replacement object for each of the plurality of essential objects based on the persistent object;
    (c) a hydrate method within each of the plurality of essential objects, said hydrate method implemented to instantiate replacement non-essential objects and generate non-essential values.

9. The system of claim 8, further comprising logic within the hydrate method to compensate for changes within the software environment.

10. The system of claim 8, wherein said access to said persistent storage by the software environment is by way of a communications data network.

11. A computer storage medium containing an a series of instructions executing on a computer for saving and recovering the state of software in an object oriented software environment, said series instructions comprising the steps of:
    (a) recording persistent objects into persistent storage, said recording occurring at times designated by each of a plurality of essential objects;
    (b) instantiating a replacement object for each of the plurality of essential objects, based on the persistent object;
    (c) executing a hydrate method within each of the plurality of essential objects;
    (d) instantiating replacement non-essential objects; and
    (e) generating non-essential values.

* * * * *

UNITED STATES PATENT AND TRADEMARK OFFICE
CERTIFICATE OF CORRECTION

PATENT NO. : 6,295,611 B1 Page 1 of 1
DATED : September 25, 2001
INVENTOR(S) : William Hayden Conner and Bruce Kenneth Haddon It is certified that error appears in the above-identified patent and that said Letters Patent is hereby corrected as shown below:

Column 10, claim 11,
Line 44, please delete -- an -- after containing.

Signed and Sealed this

Fifth Day of March, 2002

Attest:

JAMES E. ROGAN
*Attesting Officer* — *Director of the United States Patent and Trademark Office*